Jan. 11, 1955  H. T. TORNBERG  2,698,964
PLASTIC EXTRUSION MACHINE WITH PRESSURE CONTROL MEANS
Filed July 11, 1952  3 Sheets-Sheet 1

INVENTOR
HENNING T. TORNBERG
BY
ATTORNEY

Jan. 11, 1955 H. T. TORNBERG 2,698,964
PLASTIC EXTRUSION MACHINE WITH PRESSURE CONTROL MEANS
Filed July 11, 1952 3 Sheets-Sheet 2

INVENTOR,
HENNING T. TORNBERG
BY
ATTORNEY

Jan. 11, 1955  H. T. TORNBERG  2,698,964
PLASTIC EXTRUSION MACHINE WITH PRESSURE CONTROL MEANS
Filed July 11, 1952  3 Sheets-Sheet 3
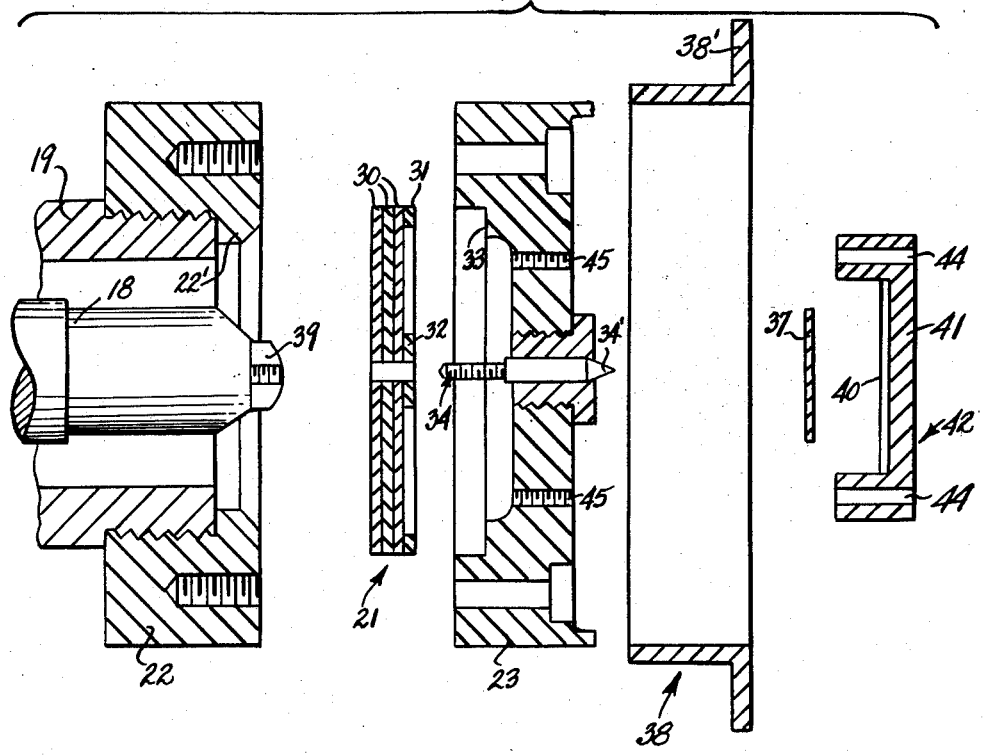
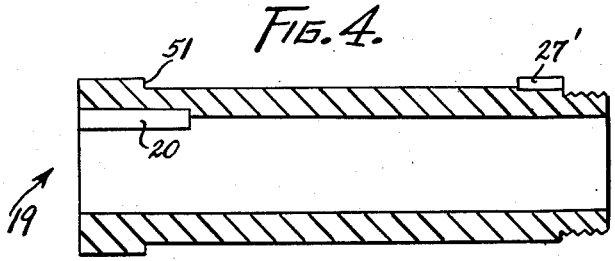
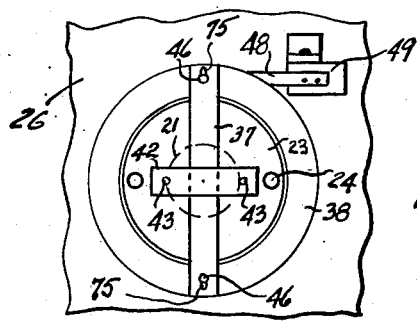
INVENTOR,
HENNING T. TORNBERG
BY
ATTORNEY

United States Patent Office 2,698,964
Patented Jan. 11, 1955

2,698,964

PLASTIC EXTRUSION MACHINE WITH PRESSURE CONTROL MEANS

Henning T. Tornberg, Ridgewood, N. J., assignor to Modern Plastic Machinery Corp., Lodi, N. J., a corporation of Delaware Application July 11, 1952, Serial No. 298,223

9 Claims. (Cl. 18—12)

The present invention relates to improvements in plastic extrusion machines of the type having a conveyor screw rotatable within a cylinder; said screw feeding plasticized material through an extrusion die. More particularly, this invention concerns itself with means to control the pressure of flow through the die.

An object of this invention is to provide a novel and improved construction in extruders of the type mentioned, for accomplishing automatic control of the pressure of the flow through the extrusion die.

Another object hereof is to provide such novel and improved pressure control means which is sensitive to respond to comparatively small changes in pressure.

A further object hereof is to provide such novel and improved control means which will maintain such pressure constant for all practical purposes, at a predetermined intensity which is adjustable as working conditions require.

Another object hereof is to provide such novel and improved construction which is easy to manipulate and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a fragmentary, central longitudinal sectional view of an extruding machine embodying the teachings of this invention. The discharge end of the machine which includes the die is not shown, but is well understood in the art as the continuation of this view to the left of the part shown. This Fig. 1 shows the hopper-end of the conveyor screw in its cylinder, the bearing structure to support and take up the screw's thrust, the drive gear or pulley for said screw, and at the extreme right, is shown the pressure control means.

Fig. 3 is an exploded view of the section taken at lines 3—3 in Fig. 2.

Fig. 4 is a longitudinal section of the sleeve member which is associated with the extruder screw.

Fig. 5 is a small scale rear view of the parts shown in Fig. 3 when assembled. In fact, it is a partial side view of Fig. 1 which is the rear end of the machine.

Fig. 6 is a wiring diagram of the electrical circuit of the motor for driving the screw's gear or pulley.

Figure 1:
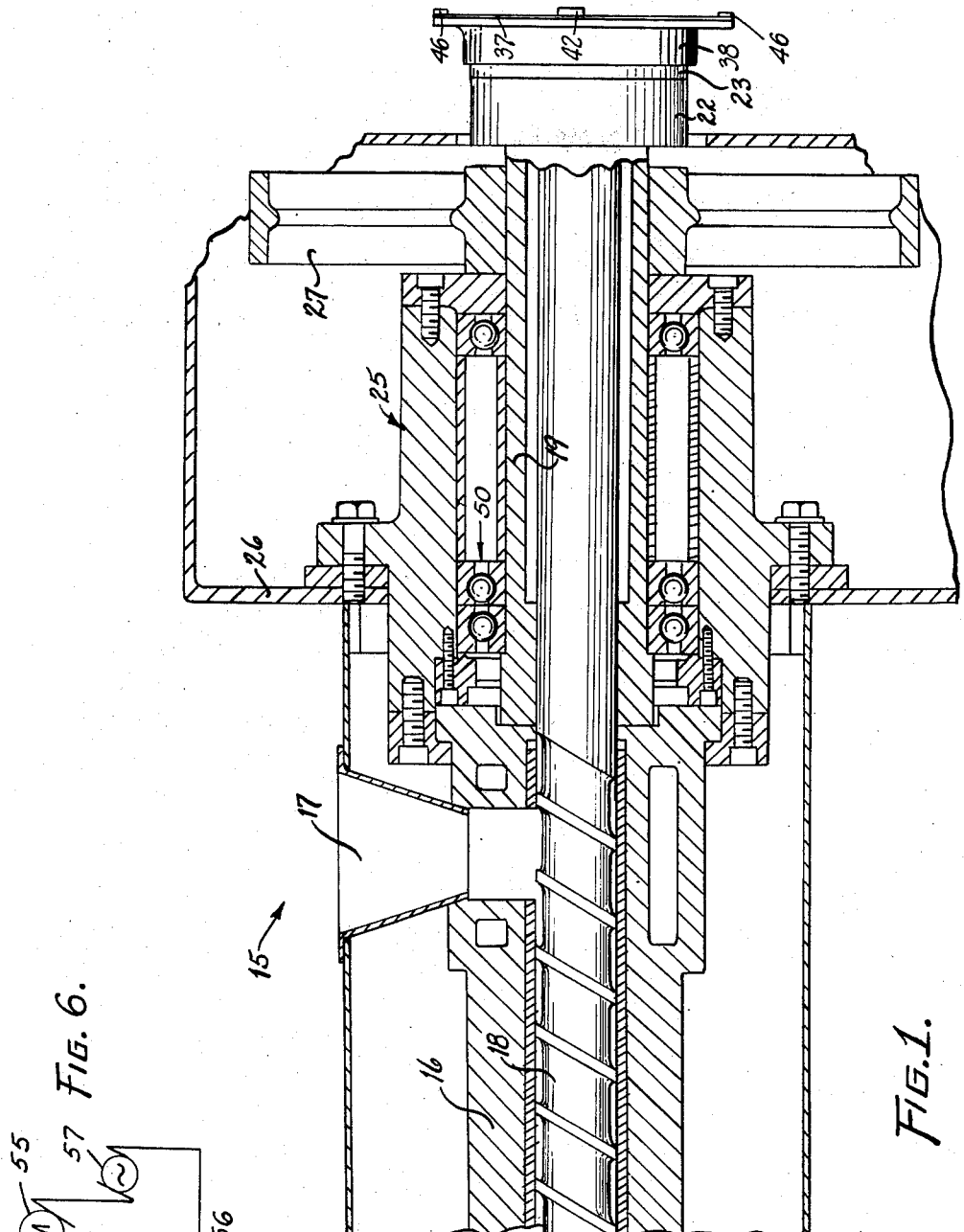
Figure 2:
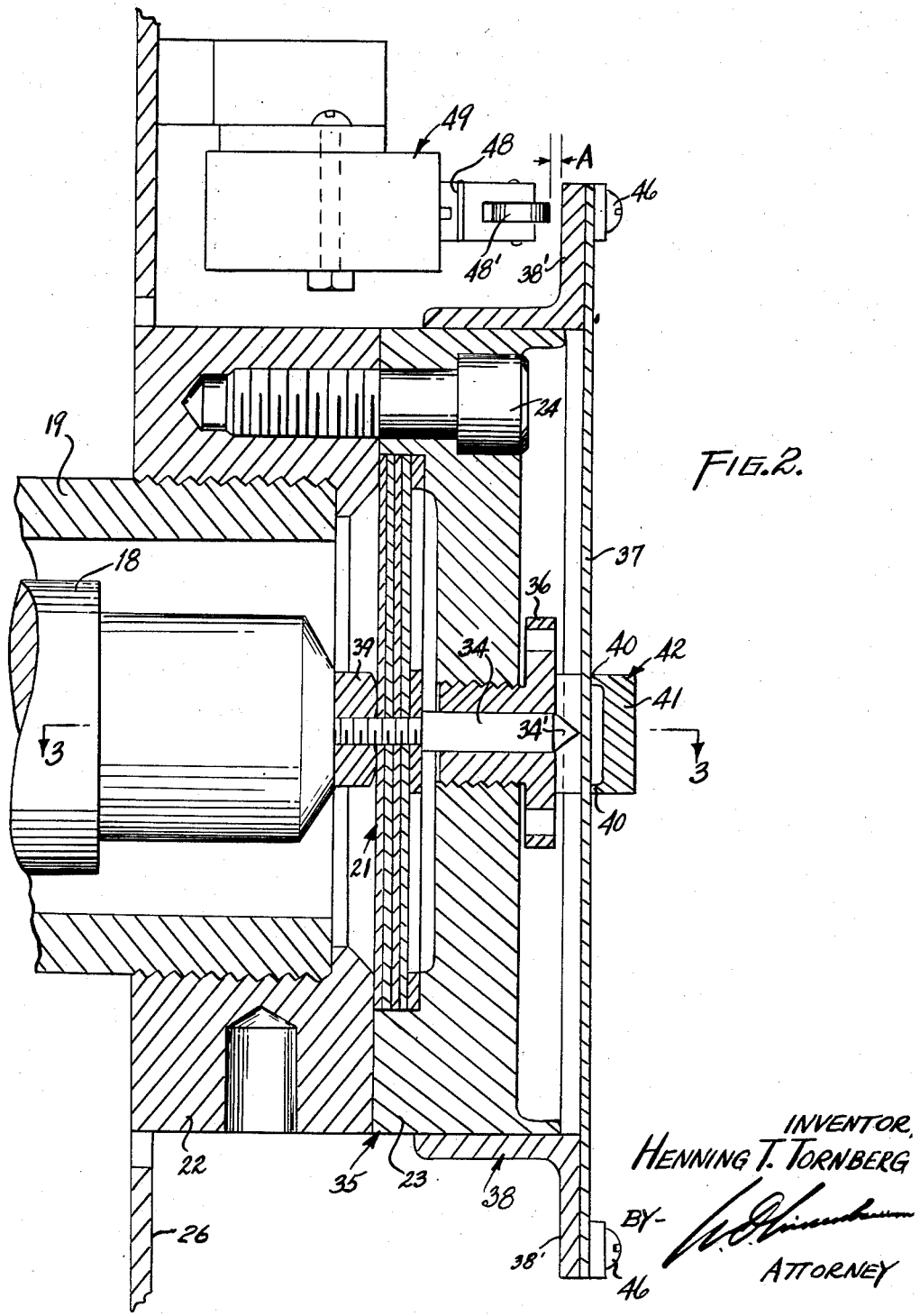
Fig. 2 is an enlarged cross-sectional view of said pressure control means shown in Fig. 1.

In the drawings, the numeral 15 designates generally a plastic extrusion machine having the cylinder 16 in which, material fed from the hopper 17, is plasticized in manner well known, and conveyed by the rotatable conveyor screw 18 through a die at the left end of the cylinder in Fig. 1. The die-end of said screw and the die itself, are not shown, because only the rear end of the machine is illustrated in this view; the die-end of the machine, being usually the front end. Particularly that part of the screw 18 which is shown to the right of the hopper 17 in Fig. 1, shall be denoted as the rear end of the said screw.

A sleeve indicated by the numeral 19 is concentrically mounted in spaced relation about an inward portion of such rear end of the screw 18, and is keyed to said screw at 20 so that said sleeve and screw rotate together, though said screw is free for some longitudinal movement through said sleeve to stress the spring diaphragm designated generally by the numeral 21 which is mounted on said sleeve, for instance as a partition within a cap structure 35 made up of the collar 22 and the end member 23 secured across said collar by means of the bolts 24. This cap 35 is securely mounted on and constitutes the rear end of said sleeve 19. This sleeve is rotatably mounted in a bearing structure indicated generally by the numeral 25 which is secured on the main frame 26 of the machine 15. The capped end of this sleeve 19 extends rearwardly from said bearing structure, and securely carries thereon a drive gear or pulley 27, upon rotation of which, the said conveyor screw will rotate. The said drive gear may be keyed at 27'.

The spring diaphragm 21 is composed of a number of spring steel discs 30. The numeral 31 indicates a flat ring and 32 is a washer. The cap component 23 is formed with a stepped recess within the cap structure, affording a seat 33 for the discs 30. The cap component 22 has an inward flange 22'. It is said seat and flange which clamp the discs 30 and mount said disc assembly as a spring diaphragm within the cap structure 35 carried on the end of the sleeve 19. The rear end of the conveyor screw 18 is preferably of reduced diameter and somewhat convex for contact with said spring diaphragm 21. A stud 34 extends rearwardly from said reduced end of the screw 18, through central holes in the spring steel discs 30 and outwardly from a bushing 36 in the face of the cap 35, where it terminates in a blunt point 34' for constant contact with a blade spring 37 carried across the face of a sleeve member 38 which is mounted free to slide on the capped end of sleeve 19. That part of the shank or stud 34 which lies through the discs 30, is of reduced diameter and is terminally threaded for engagement in the reduced screw end or teat 39. The stud 34 is an axial extension of the screw 18 and its teat 39, and the pointed end 34' of said stud contacts the mid point of the blade spring 37. Along the length of this blade spring, against its rear surface, meaning its surface other than that in contact with the stud 34, there is a pair of stop elements 40, with point 34' midway between them. These stop elements are fixed to the cap 35 and are preferably the longitudinal edges of the side walls of a channel 41 which is the spanning element of a bridge 42. Bolts 43 secure said bridge member onto the face of the cap 35; the clear holes 44 and the threaded sockets 45, being therefor provided. The ends of the blade spring 37 are secured to the flange 38' of the sleeve 38 as shown at 46.

Upon operation of the electric motor 55 which is connected by belting or gearing (not shown) to the drive wheel 27, the conveyor screw 18 and all the latter carries, shown in Figs. 3 and 4, will rotate with said screw. Upon feeding material through the hopper 17 and thence in plasticized state to the die of the machine 15, a tremendous pressure is caused to exist at the die-end of the said conveyor screw, causing said screw to be thrust towards its rear end, thereby flexing the spring diaphragm 21, when the force acting is above a certain strength which is predetermined and said diaphragm spring accordingly designed for. Any such rearward movement of said screw 18 will be imparted to the center region of the blade spring 37, causing said blade spring to become flexed and bowed concavely towards the die-end of the machine, whereupon sleeve 38 will slide with flange 38' moving towards the operating member 48 of an electrical switch means 49 which is secured onto the machine frame. This switch, in any suitable manner controls the operation of the machine's motor 55, preferably to stop it. Suitable electrical systems for such purpose are well known and may for instance be provided as shown in Fig. 6, where switch 49, normally closed, is in series with the motor 55, a manually-operated switch 56 and a source of current supply 57. The limits of permissible pressure range at the die, is adjustable by altering the distance "A" between the flange 38' and the spring-loaded switch operating member 48; such member being provided with a roller 48' to ride on the face of the flange 38' when the pressure existing at the die reaches in excess of that desired. To permit the bowing of the blade spring 37 and attending movement of the sleeve 38, screws 46 are through longitudinal slots 75 in said blade spring. The thrust of the sleeve 19 may be taken up by suitable provision in the bearing structure 25 and by said sleeve having an enlarged end acting as a flange 51 against a thrust bearing 50. As is evident, replacements of the steel spring discs of the unit 21, and of the blade spring 37, can be easily made.

As mentioned, when the pressure at the die-end of the screw 18 builds up, the rearward thrust on said screw causes it to flex the spring diaphragm 21 and the pointed stud 34 will act on the blade spring 37 to flex it and cause it to bow, whereupon sleeve 38 will move. If such thrust be of a force beyond the prescribed limit, flange 38' of said sleeve will cause the operation of the switch 49 and the machine's motor will stop. The pressure at the die and the attending thrust on the conveyor screw 18, will subside to an extent whereby the sleeve 38 will move to the right due to the straightening of the blade spring 37. The switch operating arm 48 will now be released from the flange 38' and the motor circuit will again close and the machine operate. The response is rapid. The slowing down of the motor upon cut in the current feeding it, immediately causes a reduction in pressure at the discharge end of the screw 18, and machine operation actually is not materially interrupted, but the said pressure is maintained between the prescribed limits.

This invention is capable of various forms and numerous applications without departing from the essential features herein disclosed. It is therefore intended and desired that the embodiment shown herein shall be deemed illustrative and not restrictive and that the patent shall cover all patentable novelty herein set forth; reference being had to the following claims rather than to the specific description herein to indicate the scope of this invention.

I claim:

1. In a plastic extrusion machine of the character described, a cylinder having a discharge end, a conveyor screw positioned therein for axial rotation, adapted to feed material towards the discharge end of the cylinder, a sleeve positioned about said screw; said screw being keyed to said sleeve to turn with it and to be free for axially sliding movement with respect thereto, a fixed bearing structure supporting said sleeve for rotary movement therein; said sleeve being rearwardly of the cylinder and extending rearwardly from the bearing structure, a wheel securely carried on the sleeve, a second sleeve free for axial sliding movement about the rear end of the first mentioned sleeve, a blade spring carried across the rear end of the second sleeve, a shank extending axially rearwardly from the screw, in contact with the front surface of the blade spring, a member extending from the first mentioned sleeve and in the rear of said blade spring, a pair of spaced elements extending forwardly of said member, in contact with the rear surface of the blade spring; the rear end of said shank being between said elements with respect to said blade spring whereby on movement of the screw rearwardly in the cylinder, the blade spring will become bowed and stressed, whereupon the second sleeve will slide forwardly towards the discharge end of the cylinder and means to control the movement of the driving wheel, including a movably mounted arm in the path of the second sleeve; said arm when in normal rest position, allowing operation of the driving wheel, and when moved by the second sleeve a predetermined amount, will cause the speed of the driving wheel to diminish.

2. An extrusion machine as defined in claim 1, wherein the member behind the blade spring having two elements in contact with the blade spring, comprises a channel whose longitudinal walls serve as said elements, whereby on rearward movement of the screw, said blade spring at its mid region will be pushed into the channel, thereby causing said blade spring to become bowed and stressed.

3. An extrusion machine as defined in claim 1, including another spring means carried along with the first mentioned sleeve and acted on by the screw to stress same when the screw moves away from the discharge end of the cylinder.

4. An extrusion machine as defined in claim 3, wherein the said other spring means comprises a diaphragm spring structure having a central hole through which the mentioned shank is positioned; said shank being of reduced cross section in relation to the screw, thereby forming a shoulder on the screw acting against said diaphragm.

5. In an extrusion machine, a cylinder having a discharge end, a conveyor screw positioned for axial rotation therein, adapted to feed material towards the discharge end of the cylinder, a sleeve concentrically positioned on the said screw; such screw being keyed to said sleeve to turn with it and be free for sliding movement with respect to said sleeve along the axis thereof, a fixed bearing structure supporting said sleeve for rotary movement; said sleeve being rearwardly of the cylinder and extending from the rear end of the bearing structure, a wheel securely carried on the sleeve, means including an electric motor to drive said wheel, a circuit for operating said motor including a switch means having a spring-loaded operating arm which when moved to stress the spring associated therewith, will open the motor circuit and which when released to return to its normal rest position, will cause the motor circuit to be closed, a spring means carried on the said sleeve in contact with the rear end of the screw and adapted to be stressed by movement of said screw when the latter shifts axially rearwardly from the discharge end of the cylinder, a second sleeve free for axial sliding movement on the rear end of the first mentioned sleeve for cooperation with said operating arm, a blade spring carried across the rear end of the second sleeve, a shank of reduced size extending axially rearwardly from the rear end of the screw; the rear end of said shank being in contact with the front surface of the blade spring, a member extending from the sleeve first mentioned and in the rear of the blade spring, a pair of spaced elements extending forwardly of said member, in contact with the rear surface of the blade spring; the rear end of the said shank being intermediate said elements whereby on movement of the screw rearwardly in the cylinder, the first mentioned spring means will become stressed and said blade spring will become bowed and thereby stressed, whereupon the second sleeve will slide towards the discharge end of the cylinder and move the switch-operating arm.

6. An extrusion machine as defined in claim 5, wherein the first mentioned spring means comprises a plurality of discs fixed to the first mentioned sleeve away from the axis line thereof; said discs having a central hole through which the mentioned shank is positioned.

7. An extrusion machine as defined in claim 6, wherein the end of the screw in contact with the forward one of said discs, is a convex surface.

8. An extrusion machine as defined in claim 6, wherein the member behind the blade spring, having two elements in contact with said blade spring, one at either side of the mentioned shank, comprises a channel whose longitudinal walls serve as said elements, whereby on rearward movement of the screw, the shank will push the mid region of the blade spring into said channel, thereby causing said blade spring to become bowed and stressed.

9. An extrusion machine as defined in claim 6, wherein the rear end of the first mentioned sleeve constitutes a cap structure and wherein said discs are held in said cap and form a spring diaphragm therein.

References Cited in the file of this patent

UNITED STATES PATENTS

| | | |
|---|---|---|
| 1,914,486 | Burton | June 20, 1933 |
| 2,232,545 | Lum | Feb. 18, 1941 |
| 2,493,591 | Newton | Jan. 3, 1950 |